July 17, 1923.

W. F. HOSFORD 1,461,758

CABLE MEASURING DEVICE

Filed Feb. 1, 1919

Inventor
William F. Hosford
by H. E. Roberts Atty.

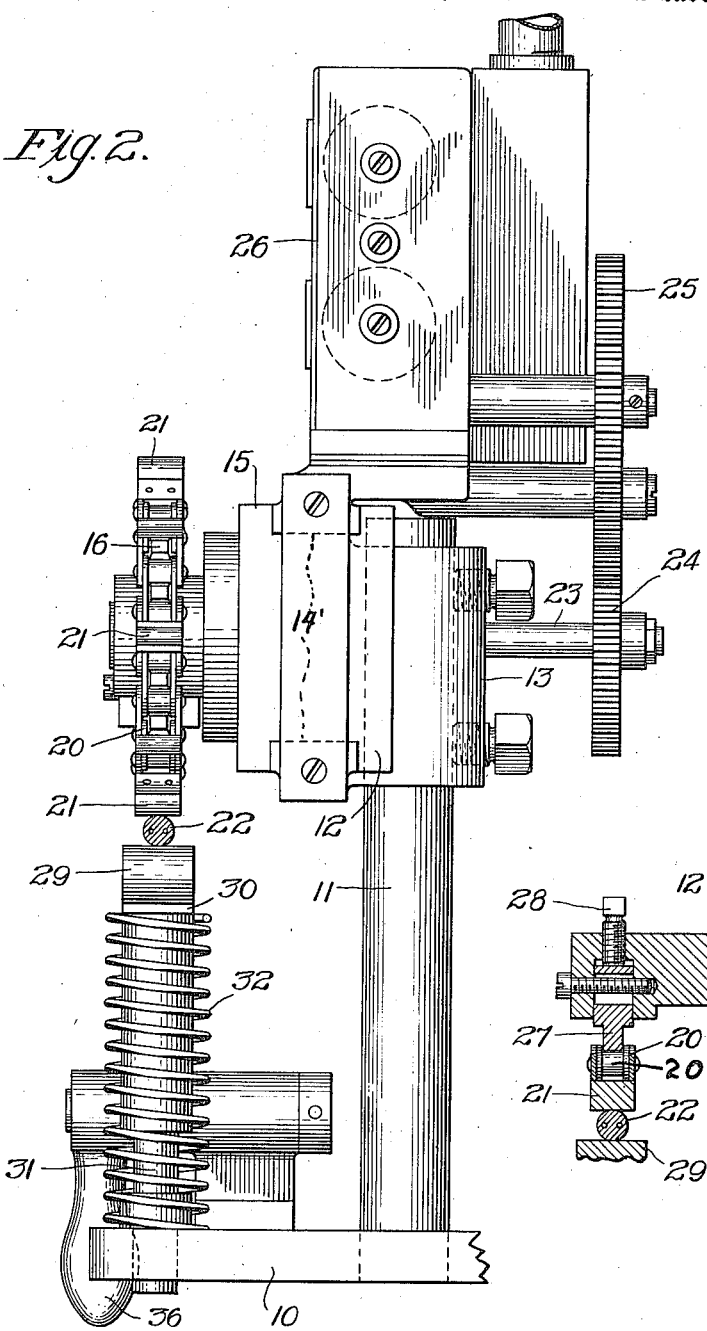

Patented July 17, 1923.

1,461,758

UNITED STATES PATENT OFFICE.

WILLIAM F. HOSFORD, OF OAK PARK, ILLINOIS, ASSIGNOR TO WESTERN ELECTRIC COMPANY, INCORPORATED, OF NEW YORK, N. Y., A CORPORATION OF NEW YORK.

CABLE-MEASURING DEVICE.

Application filed February 1, 1919. Serial No. 274,560.

*To all whom it may concern:*

Be it known that I, WILLIAM F. HOSFORD, a citizen of the United States, residing at Oak Park, in the county of Cook and State of Illinois, have invented certain new and useful Improvements in a Cable-Measuring Device, of which the following is a full, clear, concise, and exact description.

This invention relates to a driving mechanism for cable measuring devices, and has for its object the provision of a driving mechanism which will cause a counter to accurately register the exact number of feet of cable drawn from a machine.

In accordance with the general features of this invention there is provided a suitable counter driven from the traveling cable through the agency of connecting means which prevents slippage between the cable and driving means. The connecting means between the cable and the counter may comprise an endless traveling member, preferably a sprocket chain running over sprocket wheels, one of which is connected with a counter, the chain being provided with non-slipping projections adapted to engage the cable for a portion of its length. Means are provided for varying the pressure between the cable and the projections on the endless traveling member.

In the drawings illustrating this invention

Fig. 2 is an end view thereof;

Fig. 3 is a fragmentary vertical sectional view on the line 3—3 of Fig. 1.

Figure 1:
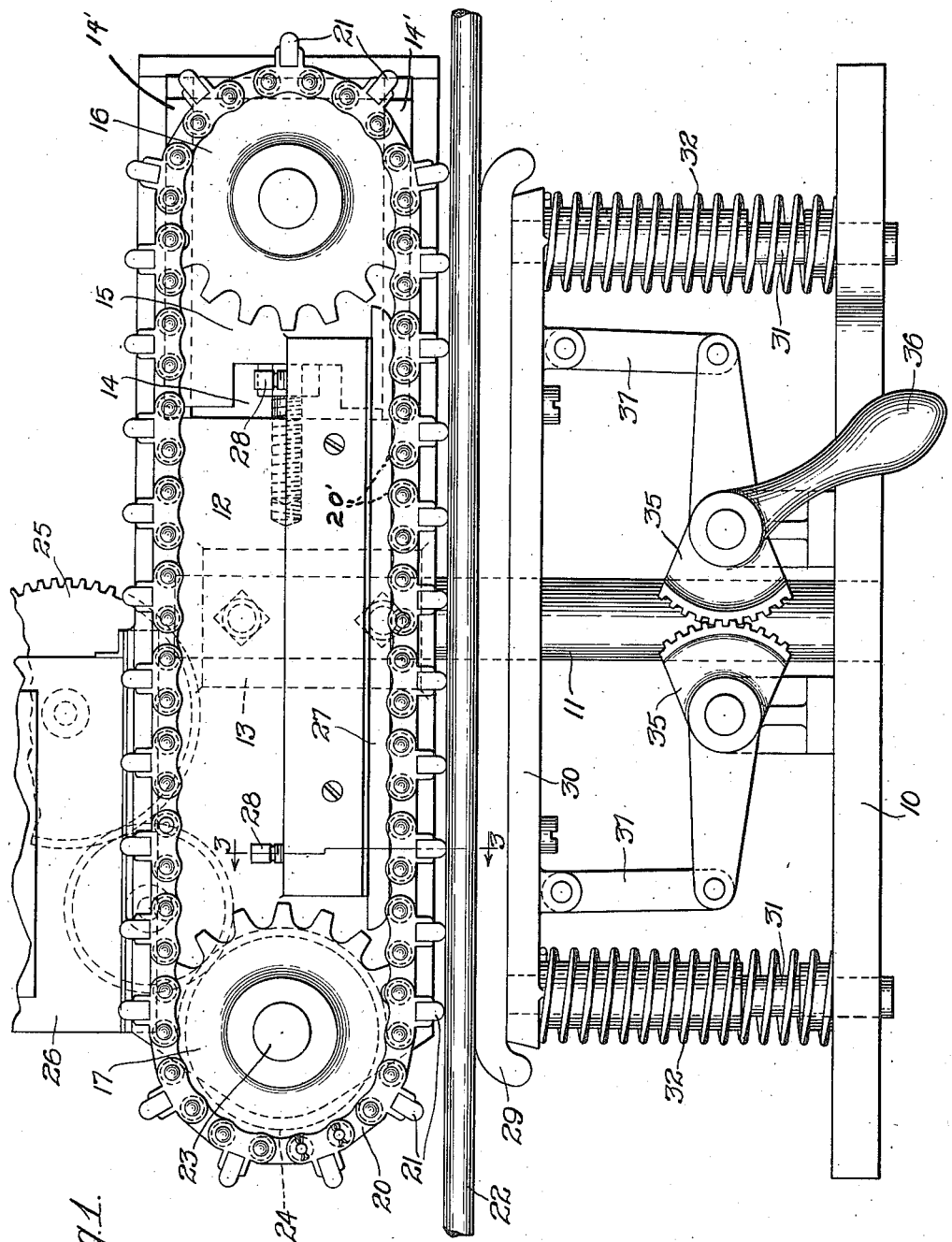
Fig. 1 is a front elevation of the complete device with part of a standard counter which is used with slight modifications broken away.

As illustrated in Figs. 1 and 2, the complete device is mounted on a base plate 10, which has secured to it intermediate its length a main supporting stud 11 which supports a frame 12. The frame 12 at its rear has secured to it a boss 13 through which said stud passes, and is held in position by suitable set screws. The frame 12 is forked at one end, as indicated at 14, to carry a take-up bearing 15 which carries a sprocket wheel 16, and at its opposite end said frame carries a second sprocket wheel 17. The take-up bearing 15 slides on rails 14' which form the side members of the forked end of the frame 12.

Around the sprocket wheels 16 and 17 is placed a chain 20 equipped with pads 21 composed of rubber or any suitable yielding material which will exert a gripping action on a cable 22. The links comprising the chain 20 are pivoted to each other by suitable studs each of which mount a rotatable sleeve or roller 20'. The sprocket 17 is mounted on a shaft 23 which is extended back of the frame 12 and carries a gear 24. The gear 24 drives a gear 25 mounted on the main drive shaft of a counter 26 of the "Durant" or some other suitable type.

Intermediate the sprockets 16 and 17 and bearing downward on the rollers 20' on the inside of the chain 20 is an adjustable guide 27 by means of which pressure is applied on the chain by set screws 28 which bear down on the guide 27, as clearly shown in Fig. 3. The function of the rollers 20' is to reduce to a minimum the friction between the guide 27 and the chain 20 and at the same time to allow pressure to be applied on the chain 20.

A lower guide 29 is secured to a support 30 having studs 31 secured at each end thereof. The lower ends of studs 31 have a loose bearing in the supporting plate 10. The lower guide 29 and the support 30 are forced upwardly by springs 32 surrounding the studs 31 and bearing between the plate 10 and the support 30. To move the guide 29 downwardly without causing the studs 31 to bind on the plate 10 there are provided two gear sectors 35, 35 connected with a handle 36 the movement of which in a clockwise direction, through connecting links 37, 37, draw the support 30 and guide 29 downwardly against the tension of the springs 32, 32 without varying the horizontal position thereof.

In operation the cable 22 which is to be drawn from the stranding machine is run between the chain carrying the pads 21 and the lower guide 29 which at the time of inserting the cable is in its down position. The lower guide is now moved up by operating the handle 36 and pressure between the pads 21 and the cable 22 is adjusted to prevent slippage therebetween by adjusting the guide 27 through the turning of set screws 28. As the cable is drawn the chain will move with it, and through the sprocket 17 the gears 24 and 25 will drive the register 26 which will register the number of feet drawn.

What is claimed is:

1. In a device for measuring cable, an endless movable member, rotatable elements supporting and driven by said endless movable member, means carried by said endless movable member for frictionally engaging the cable, a spring supported guide over which the cable travels, means for moving said guide into and out of contact with the cable, adjustable means cooperating with the endless movable member for varying the pressure between the cable and the frictional engaging means on the movable member, and registering means driven by one of said rotatable elements.

2. In a device for measuring cable, an endless movable member adapted to be moved by the cable, rotatable elements supporting and driven by said endless member, means carried by said endless movable member for frictionally engaging the cable, a guide member upon which the cable travels, means for moving said guide out of engagement with the cable, an adjustable guide engaging said endless movable member for varying the pressure between the cable and the frictional engaging means, means for adjusting said last named guide, and registering means driven by one of said rotatable elements.

3. In a device for measuring cable, an endless movable member adapted to be moved by the cable, rotatable elements supporting and driven by said endless member, means carried by said endless movable member for frictionally engaging the cable, spring supported guide means over which the cable travels, means for moving said guide against the tension of its spring to release the cable, adjustable means engaging the endless movable member for varying the pressure between the cable and the frictional engaging means on the movable member, and registering means driven by one of said rotatable elements.

4. In a device for measuring cable, an endless movable member adapted to be moved by the cable, rotatable elements supporting and driven by said endless member, means carried by said endless movable member for frictionally engaging the cable, a guide member upon which the cable travels, means for moving said guide member into and out of contact with the cable, an adjustable guide engaging said endless movable member upon the opposite side from said first named guide member for varying the pressure between the cable and the frictional means, and registering means driven by one of said rotatable elements.

5. In a device for measuring cable, an endless movable member, rotatable elements supporting and driven by said endless member, said endless movable member comprising a plurality of pivotally connected members adapted to be moved by the cable, anti-friction rollers associated with the pivotally connected members, means carried by said endless movable member for frictionally engaging the cable, a guide member upon which the cable travels, an adjustable guide engaging said anti-friction rollers for varying the pressure between the cable and the friction means, and registering means driven by one of said rotatable elements.

In witness whereof, I hereunto subscribe my name this 20th day of January A. D., 1919.

WILLIAM F. HOSFORD.